United States Patent

Umbarger

[11] Patent Number: 5,749,635
[45] Date of Patent: May 12, 1998

[54] REVERSIBLE TRACK LINK FOR AN ENDLESS TRACK

[76] Inventor: Daryl Umbarger, 790 W. Ironwood, Gwinn, Mich. 49841

[21] Appl. No.: 400,808

[22] Filed: Mar. 8, 1995

[51] Int. Cl.$^6$ ........................ B62D 55/20
[52] U.S. Cl. ............... 305/190; 305/187; 305/201
[58] Field of Search ............... 305/185, 187, 305/190, 191, 192, 194, 198, 200, 201, 39

[56] References Cited

U.S. PATENT DOCUMENTS

| | | |
|---|---|---|
| 1,469,001 | 9/1923 | Gentry . |
| 2,211,896 | 8/1940 | Johnston ............... 305/191 X |
| 2,211,897 | 8/1940 | Johnston ............... 305/191 X |
| 2,329,303 | 9/1943 | Stewart ............... 305/187 X |
| 3,237,999 | 3/1966 | Pentecost . |
| 3,359,044 | 12/1967 | Boggs ............... 305/201 |
| 3,416,846 | 12/1968 | Eastman . |
| 3,717,389 | 2/1973 | Boggs ............... 305/187 X |
| 3,815,962 | 6/1974 | Stedman et al. . |
| 3,851,931 | 12/1974 | Crisafulli . |
| 3,947,074 | 3/1976 | Nelson . |
| 4,159,857 | 7/1979 | Purcell . |
| 4,306,753 | 12/1981 | Livesay et al. ............... 305/201 |
| 4,428,625 | 1/1984 | Wolhford ............... 305/198 X |
| 4,861,120 | 8/1989 | Edwards et al. . |
| 4,884,852 | 12/1989 | Edwards et al. . |
| 5,005,921 | 4/1991 | Edwards et al. . |
| 5,040,282 | 8/1991 | Edwards et al. . |

*Primary Examiner*—Russell D. Stormer
*Attorney, Agent, or Firm*—Reising, Ethington, Barnard & Perry

[57] ABSTRACT

A reversible endless track 10 engages a drive sprocket 12 and track rollers 14 of a track type vehicle. The endless track 10 has a plurality of track link assemblies 16 that includes a symmetrical track link 20, wear bars 22 with rail surfaces 24, and track shoes 26. The track link has a central relief port 30. An upper and lower wear bar 22 are slidably mounted onto the upper and lower surfaces 32 and 34 of the track link forming a mortise joint 50. A pair of plow bolts 54 pass through a respective aperture 56 in the wear bar 22 and extend through the entire assembly. The bolts have extending threaded ends 55 that engage an acorn nut 60 in its threaded receptacle 62 to affix track shoe 26 thereon. The head surface 66 of the bolt 54 is flush with the rail surface 24 of the wear bar 22.

19 Claims, 3 Drawing Sheets

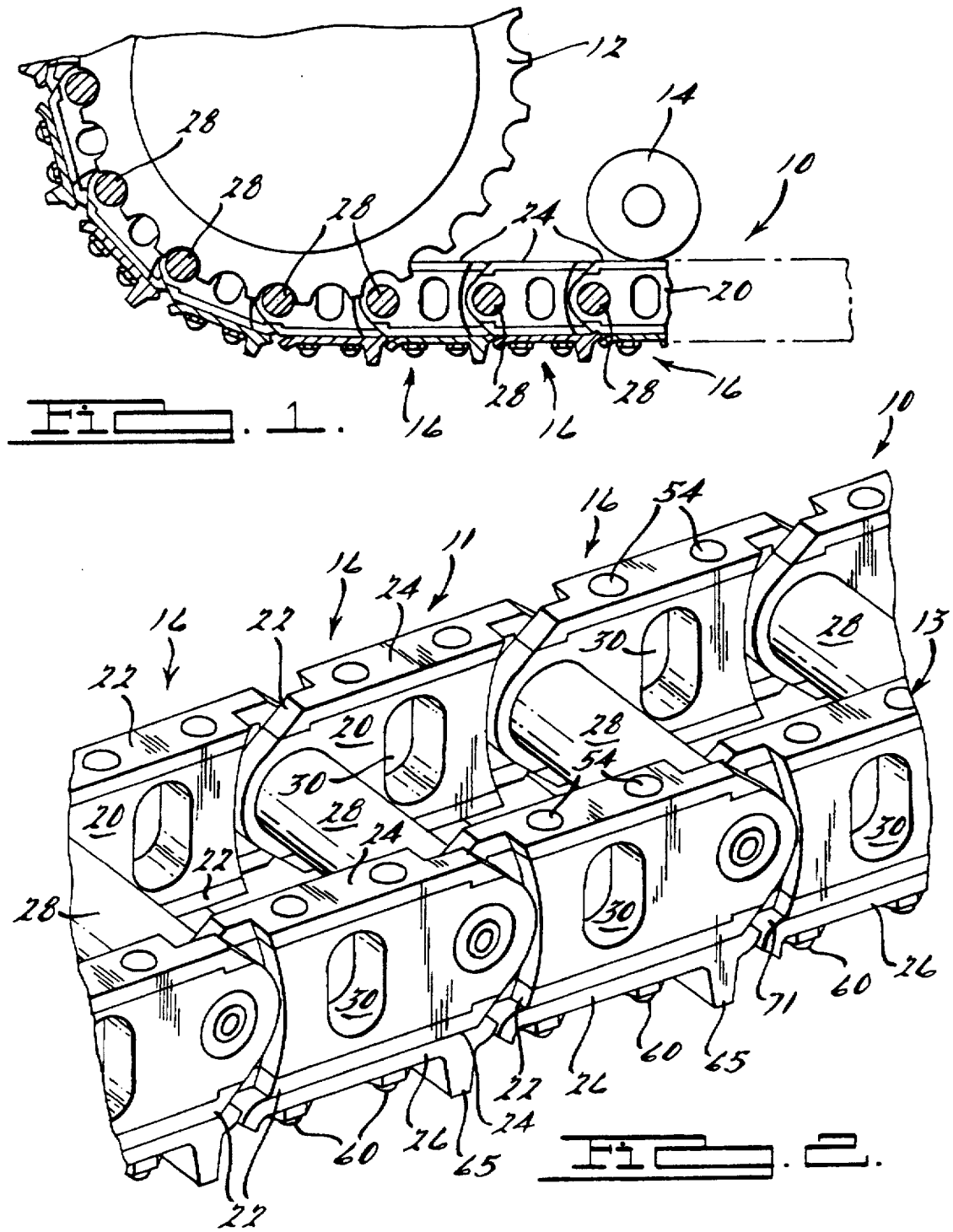

REVERSIBLE TRACK LINK FOR AN ENDLESS TRACK

TECHNICAL FIELD

The field of this invention relates to a reversible endless track assembly for a track type vehicle.

BACKGROUND OF THE DISCLOSURE

For conventional track type vehicles such as bulldozers, track loaders, and crawler-type tractors, each track assembly includes a plurality of links pivotally connected together by pin and bushing assemblies. The pin and bushings may also function as drive lugs adapted to engage the teeth of a drive sprocket. Furthermore, a lower surface of each track link has a track shoe (i.e. grouser plate) bolted thereon. The upper surface of the track link forms a rail surface.

The bushings are subject to wear and require periodic rotation, repair or replacement. It is recognized that the pulling, rotation and replacement of the pins and bushings is expensive and time consuming and requires skilled labor to properly complete such service. Attempts have been made to provide reversible link assemblies where the track shoes only need to be removed and the endless track flipped over. In this procedure, the upper surface becomes the new lower surface and the lower surface becomes the new upper surface. The track shoes are then re-affixed on the new lower surface.

Furthermore, rail surfaces are also known to wear away. The wear pattern often becomes wavy. The thinner surface area of the rail over the pin and bushing bores wears fast. Furthermore, the point to point contact as the links pass around the idlers wears away the center section. As the rail surface of a conventional track link becomes excessively worn, the entire track link then needs to be replaced. The known reversible track link designs have replaceable rail surfaces to be replaced as needed and thereby extend the useful life of the original reversible track link.

Even though reversible endless track constructions have been designed for several years and the great advantage of doubling the time between the need for pulling and the pins and bushings and providing replaceable rail surfaces have been recognized, these reversible track constructions have not seen commercial viability for several reasons. Firstly, the known constructions have been overly complex to achieve reversibility, overly expensive to be economically viable, and lack integrity in overall strength that is so vitally needed to endure the harsh environment encountered by endless track systems.

Furthermore, the known reversible constructions are incompatible for use with existing components of standard non-reversible track systems. In order to achieve a flat rail surface, the reversible link assemblies use special bosses that are directly welded to the inner surface of the wear bar or use machined and stepped bolts. These specially designed components add undue complexity to the structure. In addition, these systems leave a substantial shank portion of the mounting bolt uncovered and exposed to the elements thereby making disassembly needlessly difficult and also rendering the bolt not re-usable.

What is needed is a reversible track system that is economical to manufacture, easily disassembled and reassembled. What is also needed is a reversible system that uses conventionally available nuts and plow bolts to provide a flat rail surface without compromising the structural integrity of the track link assembly. What is also needed is a fastener system for the track link assembly that encapsulates the mounting bolt from the environment to enable ease in disassembly and re-use thereof.

SUMMARY OF THE DISCLOSURE

In accordance with one aspect of the invention, a reversible track assembly for a track type vehicle includes a symmetrical track link assembly. The assembly includes a track link having upper and lower surfaces and at least one bore transversely extending through the track link and intersecting both the upper and lower surfaces of the track link. Preferably, a separate wear bar is removably affixed to the upper surface and has a counterbored aperture aligned with each respective bore in the track link. A track shoe is removably affixed to the lower surface and has an aperture aligned with each bore in the track link. An elongated fastener has a head counter-sunk in the counter-bored aperture in the wear bar and extends through a respective bore in the track link and through a respective aperture in the track shoe. The bolt has a threaded end extending therefrom. A female fastener engages the threaded end of the elongated fastener to secure the shoe, link, and wear bar together.

Desirably, the track link and the wear bar are mortised together. The wear bar has peripheral sections that extend downward and has opposing facing surfaces forming a notch of the formed mortise joint therebetween. The track link has a raised center tenon of the mortise joint at its upper surface that snugly and slidably fits within the notch between the opposing facing surfaces of the wear bar.

The aperture through the wear bar preferably has a squared section and the elongated fastener has a complementary squared neck section that is non-rotatably received in the squared section of the aperture through the wear bar. The head of the elongated fastener is desirably chamfered. The aperture through the wear bar has a complementary chamfered section that receives said chamfered head such that the head surface of the elongated fastener is flush with the upper rail surface of the wear bar. The elongated fastener is preferably threaded and engages an acorn nut that encapsulates the opposite extending end of said threaded elongated fastener.

In one embodiment, a second wear bar is interposed between the lower surface of the track link and the track shoe. The second wear bar is substantially identical to the first wear bar except that it is a mirror image thereof. The elongated fastener is sized to similarly pass through the aperture in the second wear bar and pass through the track shoe to engage the acorn nut.

In accordance with another aspect of the invention, a reversible track link assembly for an endless track assembly includes a track link having upper and lower surfaces. At least one bore transversely extends through the track link and intersects both the upper and lower surfaces of the track link. The first wear bar is removably affixed to the upper surface of said track link and has at least one aperture being aligned with at least one bore in the track link. The second wear bar is removably affixed to the lower surface of the track link and has at least one aperture being aligned with at least one bore in the track link. The track shoe is removably affixed on the second wear bar and has at least one aperture aligned with at least one bore in the track link and the respective apertures in the first and second wear bars. An elongated fastener extends through a respective bore in the track link and through respective apertures in the track shoe and the wear bars. The fastener has an end extending therefrom that engages a complimentary fastener to secure the two wear bars, track shoe, and track link together.

In accordance with another aspect of the invention, a wear bar for an endless track assembly of a track type vehicle includes a flat outer surface constructed to be engageable with an idle roller or an inner surface of a track shoe. The wear bar also has an inner surface having one of a mortise and tenon for forming a mortise joint with a track link surface. At least one aperture therethrough is alignable with a respective aperture in said track link and the track shoe for allowing an elongated fastener to pass therethrough. The wear bar has opposite ends that are inclined from a lower surface to an upper surface to be smoothly contoured with an axial edge surface of the track link.

The invention also pertains to a reversible track link for an endless track assembly where the track link has opposite upper and lower surfaces each having one of a mortise or tenon for forming a mortise joint with a wear bar. The track link has two bushing apertures and a center relief hole passing horizontally therethrough. A pair of apertures pass vertically through the track link on each side of the center relief hole and intersect the upper and lower surfaces to form vertical passages therethrough. The vertical passage is completely enclosed except for the open ends at the upper and lower surfaces.

The invention also relates to a fastener system for a track link assembly in an endless track. The track link has an upper rail surface and a lower surface and at least one bore transversely extending entirely through the track link and intersecting both the upper wear bar surface and lower surface of the track link. The track shoe is removably affixed on the lower surface and has at least one aperture aligned with a respective bore in the track link. The elongated fastener has a head counter sunk in the upper rail surface and extends through the respective bore in the track link and through the respective aperture in the track shoe and has an end extending therefrom. An acorn type female fastener engages the extended end of the elongated fastener and entirely covers the extended end to assemble the shoe and link together such that the elongated fastener has no part of its axial shank exposed. Preferably, the central relief port horizontally extends through the track link and a bore extends through the track link at each side of the relief port for receiving the elongated fastener.

BRIEF DESCRIPTION OF THE DRAWINGS

Reference now is made to the accompanying drawings in which:

FIG. 1 is a fragmentary side elevation of an endless track according to one embodiment of the invention;

FIG. 2 is fragmentary perspective and partially disassembled view of the track shown in FIG. 1;

DETAILED DESCRIPTION OF THE PREFERRED EMBODIMENT

Figure 3:
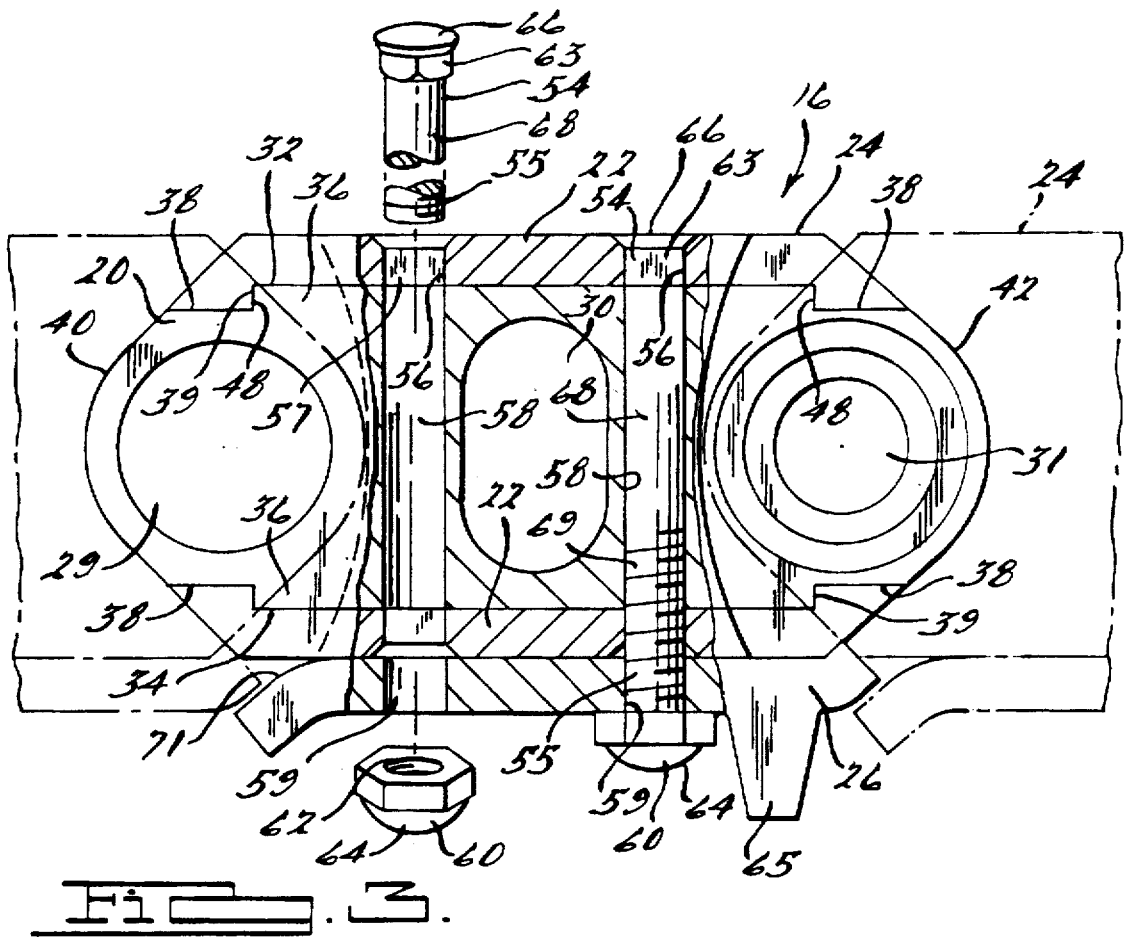
FIG. 3 is a partially exploded and partially segmented view of a track link assembly shown in FIG. 1.

Referring now to FIGS. 1 and 2, an endless track 10 engages a drive sprocket 12 and track rollers 14 of a track type vehicle. The endless track 10 has a left chain 11 and a right chain 13 connected together to form plurality of track link assemblies 16 that includes a track link 20, wear bars 22 with rail surfaces 24, conventional track shoes 26 commonly referred to as grouser pads. Pin and bushing assemblies 28 connect the individual inner track assemblies 16 to form the endless track 10.

Each link assembly 16 of the endless track 10 is substantially identical and reference is now made to one assembly 16 as shown in FIGS. 3 through 7. As shown in FIG. 3, the track link 20 has a large bushing aperture 29 and a stepped bushing aperture 31 that are shaped to receive a conventional pin and bushing assembly 28 as indicated in FIGS. 1 and 2. The track link has a central relief port 30. The upper and lower surfaces 32 and 34 are identical with each having a central tenon section 36 and stepped axially outer sections 38 that meets a contoured end edges 40 and 42. The sections 38 and section 36 have a vertical shoulder 39 therebetween. All reference to upper and lower surfaces will be made with reference to the drawings where the track link is pictured in a position where the track shoe normally engages the ground. It is also understood that each track link travels around a loop where the track shoe and link become upside down and the track shoe does not engage the ground.

An upper and lower wear bar 22 are slidably mounted onto the upper and lower surfaces 32 and 34. The rail surface 24 of the upper bar 22 receives a substantial portion of the weight of the vehicle via idler wheels 14. The rail surface 24 of the lower bar is flush against the track shoe 26. Each wear bar 22, as shown more clearly in FIG. 5 and 6, has a central notch 44 and outer stepped sections 46 have opposing vertical walls 48. The notch 44 is sized to receive the tenon 36 of the link to form a mortise joint 50. Each wear bar 22 is mortised to the link to support it against directionally directed forces along the endless track 10. The end wall 52 of the bar 22 is contoured to smoothly align with the end edges 40 and 42. Optional welding seams 53, as shown in FIG. 3, may connect the end wall 52 to the edges 40 and 42 to provide additional stability to the wear bar. These weld seams 53 may be broken when the wear bars 22 need to be replaced.

As shown in the figures the tenon 36 and mortise 44 extend fully across the width of the respective track link and wear bar 22 such that once the bolts are removed, the wear bar may be knocked off the link in a laterally sideways direction. If welded, the link and wear bar form a unitary link and the rail surface may then be said to form part of the track link itself with the fastener countersunk through the rail surface.

A pair of plow bolts 54 pass through a respective aperture 56 in the wear bar 22 and extend through a respective bore 58 that extends from the upper surface 32 to the lower surface 34 in the track link 20. The plow bolt has a squared neck section 63 that non-rotatably fits in a complementary countersunk chamfered squared section 57 of the aperture 56. The plow bolts 54 are long enough to extend through the apertures 56 in the lower wear bar 22 and apertures 59 in track shoes 26 and have threaded ends 55 extending therethrough that can be engaged by acorn nut 60 and its threaded receptacle 62. The threaded receptacle 62 is deep enough to completely receive the threaded extending end 55 and make contact with the track shoe 26. The acorn nut 60 has a closed end 64 such that the end 55 is completely encapsulated.

Figure 7:
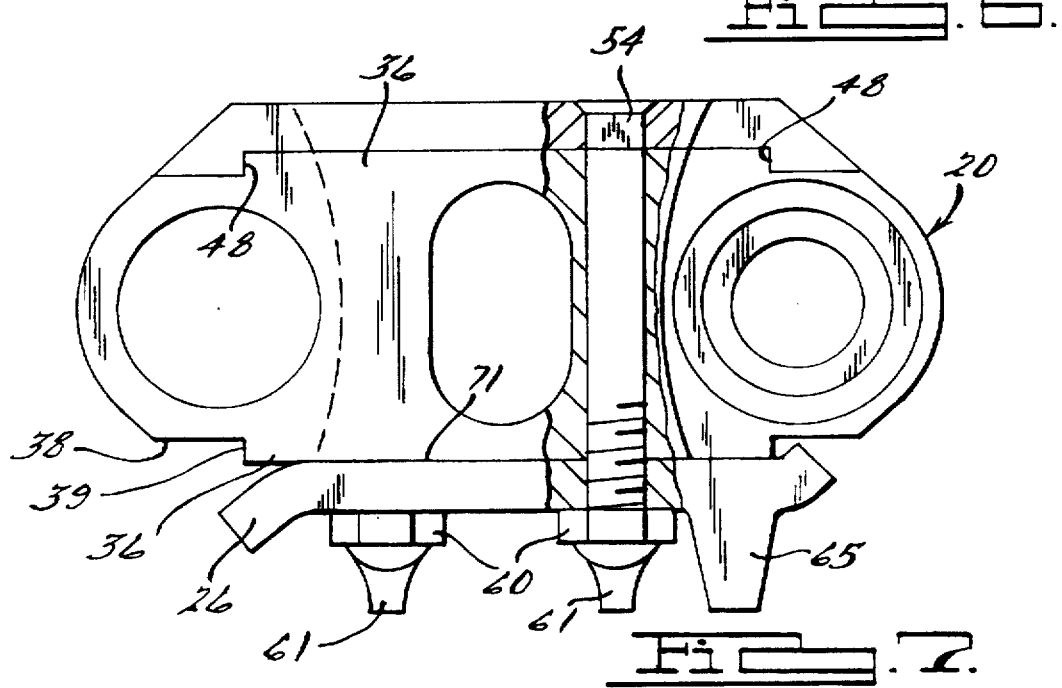
FIG. 7 is a side elevational and partially segmented view of a second embodiment.

The acorn nut 60 also provides a wear surface which can be cheaply and simply changed as wear dictates. The acorn nut may have a varying heights and degrees of hardness such as being carbide tipped. It may also be shaped with an auxiliary point or blade 61, as shown in FIG. 7, to assist in traction with the grouser 65 on track shoe 26.

Figure 4:
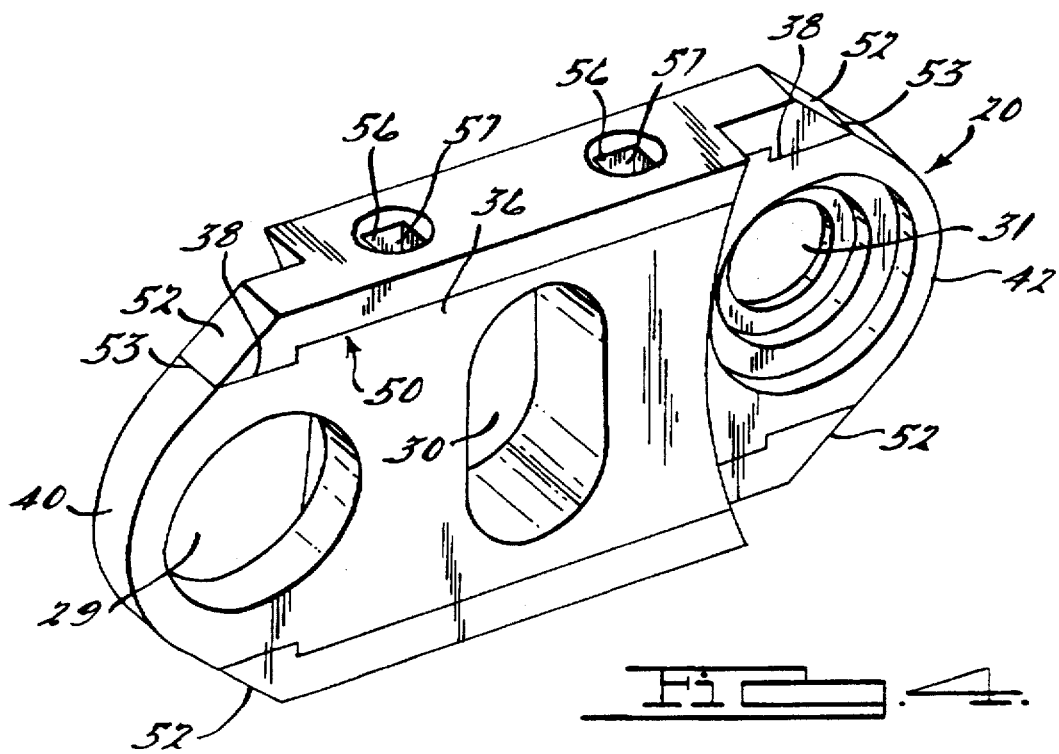
FIG. 4 is a perspective view of the track link and wear bars shown in FIG. 3.
Figure 5:
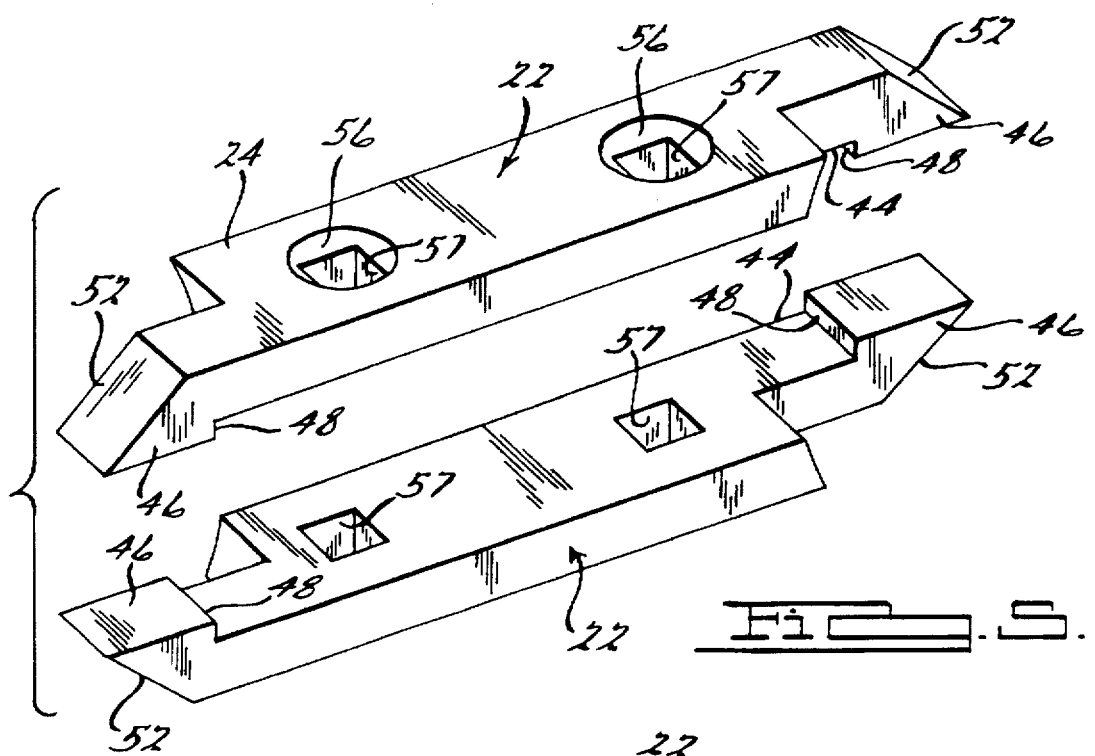
FIG. 5 is a perspective view of the pair of wear bars for the track link assembly.
Figure 6:
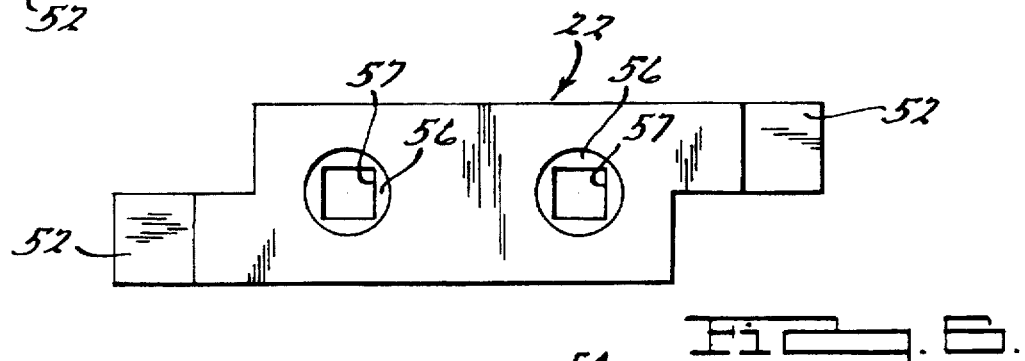
FIG. 6 is top plan view of one of the wear bars shown in FIG. 5.

As shown in FIGS. 4 and 5, the apertures 56 in the wear bars 22 are tapered or chamfered at the outer rail surface 24 to receive the plow bolts 54 such that the head surface 66 is countersunk in the countersunk, chamfered, and squared section 57 flush or recessed with respect to rail surface 24 when installed. In this fashion the plow bolt 54 has only the head surface 66 exposed and none of its shank portion 68 including the neck section 63 or thread portion 69 is exposed to the elements. Furthermore the flat head surface 66 of the bolt 54 acts as part of the rail surface when mounted flush and engages the rollers 14 thereby increasing the life of the wear bar.

The entire shank portion 68 including the entire threaded section is concealed and protected from the elements by being entirely covered by the bore 58, and apertures 56 and 59 and covered by acorn nut 60. This allows the threads to maintain much better condition and allows ease in disassembly and allows the bolt to be reused.

For the assembly shown in FIG. 3, the two wear bars 22 are left and right handed and cannot be interchanged. However, the link 20 is symmetrical and can be used for either the left chain 11 or right chain 13. As such, left and right track links are no longer necessary as with conventional non-reversible track links.

The interposition of the second wear bar 22 between the track link 20 and the track shoe 26 renders the added advantage that a perpetual flat surface for the inner surface 71 track shoe 26 exists when the endless track 10 is flipped over for its routine maintenance when the pin and bushing assemblies 28 become worn at one side. The wear bars 22 need not be installed or removed except as where breakage or exceptional wear is evident.

A second embodiment is disclosed in FIG. 7 where the second wear bar 22 is eliminated for financial savings at the time of initial purchase. The mortise joint 50 is constructed with the wide central tenon 36 positioned on the track link 20 as opposed to the wear bar 22 to enable the option of eliminating the wear bar 22 that is interposed between the track link and track shoe. The wide central tenon 36 provides sufficient amount of flat surface to provide an adequate seat for the track shoe 26 abutting directly against the track link 20. This embodiment retains the advantages of a concealed or encapsulated reusable bolt and the reversibility of the track link 20 without the need to pull the pin and bushing assemblies.

Variations and modifications are possible without departing from the scope and spirit of the present invention as defined by the appended claims.

The embodiments in which an exclusive property or privilege is claimed are defined as follows:

1. A reversible track link assembly for an endless track of a track type vehicle characterized by:

a track link having upper and lower surfaces and at least one bore transversely extending through said track link and intersecting respective upper and lower surfaces of said track link;

a wear bar removably affixed to said upper surface and having at least one aperture being counter bored and aligned with said at least one bore in said track link;

a track shoe removably affixed on said lower surface and having at least one aperture aligned with said at least one bore in said track link;

an elongated fastener having a head counter sunk in said counter-bored aperture in said wear bar and extending through a respective bore in said track link and through a respective aperture in said track shoe and having an end extending therefrom;

a female fastener engaging said end of said elongated fastener to assemble said shoe, link and wear bar together.

2. A reversible track link assembly as defined in claim 1 further characterized by:

said track link and said wear bar being mortised together.

3. A reversible track link assembly as defined in claim 2 further characterized by:

said wear bar having peripheral sections that extend downward and having opposing facing surfaces forming a notch therebetween;

said track link having a raised center section at its upper surface that snugly and slidably fits within said notch between the opposing facing surfaces of said wear bar.

4. A reversible track link assembly as defined in claim 3 further characterized by:

said aperture through said wear bar having a squared section;

said elongated fastener having a squared neck section that is non-rotatably received in said squared section of said aperture through said wear bar.

5. A reversible track link assembly as defined in claim 4 further characterized by:

said head of said elongated fastener being chamfered;

said aperture through said wear bar having a complementary chamfered section that receives said chamfered head;

said elongated fastener being threaded;

said female fastener being an acorn nut that threadably engages the extending end of said threaded elongated fastener.

6. A reversible track link assembly as defined in claim 5 further characterized by:

a second wear bar interposed between said lower surface of said track link and said track shoe;

said second wear bar having at least one aperture being counter bored and aligned with said at least one bore in said track link and having said elongated fastener passing therethrough.

7. A reversible track link assembly as defined in claim 3 further characterized by:

a second wear bar interposed between said lower surface of said track link and said track shoe;

said second wear bar having at least one aperture being counter bored and aligned with said at least one bore in said track link and having said elongated fastener passing therethrough.

8. A reversible track link assembly as defined in claim 2 further characterized by:

a second wear bar interposed between said lower surface of said track link and said track shoe;

said second wear bar having at least one aperture being counter bored and aligned with said at least one bore in said track link and having said elongated fastener passing therethrough.

9. A reversible track link assembly as defined in claim 1 further characterized by:

a second wear bar interposed between said lower surface of said track link and said track shoe;

said second wear bar having at least one aperture being counter bored and aligned with said at least one bore in said track link and having said elongated fastener passing therethrough.

10. A reversible track link assembly for an endless track of a track type vehicle characterized by:

a track link having upper and lower surfaces and at least one bore transversely extending through said track link and intersecting respective upper and lower surfaces of said track link;

a first wear bar removably affixed to said upper surface of said track link and having at least one aperture being aligned with said at least one bore in said track link;

a second wear bar removably affixed to said lower surface of said track link and having at least one aperture being aligned with said at least one bore in said track link;

a track shoe removably affixed on said second wear bar and having at least one aperture aligned with said at least one bore in said track link and said apertures in said wear bars;

an elongated fastener extending through a respective bore in said track link and through a respective apertures in said track shoe and said wear bars and having an end extending therefrom to assemble said two wear bars, track shoe and track link together.

11. A reversible track link assembly as defined in claim 10 further characterized by:

said track link and said wear bars being mortised together.

12. A reversible track link assembly as defined in claim 11 further characterized by:

each of said wear bars having peripheral sections that extend downward and having opposing facing surfaces forming a notch therebetween;

said track link having opposite raised center sections at its respective upper and lower surfaces that snugly and slidably fits within said notch between the opposing facing surfaces of said respective wear bar.

13. A wear bar for an endless track assembly of a track type vehicle comprising:

a flat outer rail surface constructed to be engageable with an idle roller or an inner surface of a track shoe;

an inner surface constructed for forming a mortise joint with a track link surface that extends the full width of said war bar;

at least one aperture therethrough that is alignable with a respective aperture in said track link and said track shoe for allowing an elongated fastener to pass therethrough;

said aperture having a countersunk section at said outer rail surface for receiving a head section of said elongated fastener.

14. A wear bar for an endless track assembly of a track type vehicle characterized by:

a flat outer rail surface constructed to be engageable with an idle roller or an inner surface of a track shoe;

an inner surface constructed for forming a mortise joint with a track link surface;

at least one aperture therethrough that is alignable with a respective aperture in said track link and said track shoe for allowing an elongated fastener to pass therethrough;

said aperture through said wear bar having a squared section for non-rotatably receiving a squared neck section of said elongated fastener; and said aperture through said wear bar having a chamfered section for receiving a chamfered head section of said elongated fastener.

15. A wear bar as defined in claim 14 further characterized by:

said wear bar having opposite ends that are inclined from an inner surface to an outer surface to be smoothly contoured with an end surface of said track link.

16. A reversible track link for an endless track assembly of a track type vehicle characterized by:

said track link having opposite upper and lower surfaces with each surface constructed for forming a mortise joint with a wear bar;

said track link having two bushing apertures and a center relief hole passing horizontally therethrough;

a pair of apertures passing vertically through said track link on each side of said center relief hole and intersecting said upper and lower surfaces to form vertical passages therethrough.

17. A reversible track link as defined in claim 16 further characterized by:

said upper and lower surfaces of said track link having a tenon of said mortise joint;

said vertical passage being completely enclosed except for said intersection at said upper and lower surfaces.

18. A reversible track link assembly in an endless track of a track type vehicle comprising:

track link having an upper rail surface and a lower surface affixed thereto and at least one bore transversely extending entirely through said track link and intersecting both the upper rail surface and lower surface of said track link;

said aperture at both of said upper rail and lower surface having a countersunk section;

a track shoe removably affixed on said lower surface and having at least one aperture aligned with said at least one bore in said track link;

an elongated fastener having a head counter sunk in said upper rail surface and extending through said respective bore in said track link and through said respective aperture in said track shoe and having an end extending therefrom;

an acorn type female fastener engaging said extended end of said elongated fastener and entirely covering said extended end to assemble said shoe and track link together such that said elongated fastener has no part of its axial extent exposed.

19. A track link system as defined in claim 18 further characterized by:

a central relief port horizontally extending through said track link;

a bore extending through said track link at each side of said relief port for receiving said elongated fastener.

* * * * *